United States Patent
Leonelli, Jr.

(10) Patent No.: US 6,375,446 B1
(45) Date of Patent: Apr. 23, 2002

(54) HIGH PRESSURE APPARATUS HAVING TRANSITION SLOPE BINDING RING THAT MITIGATES TENSILE STRESSES AND CORRESPONDING METHOD

(75) Inventor: Robert V. Leonelli, Jr., Westerville, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/740,777

(22) Filed: Dec. 19, 2000

(51) Int. Cl.[7] ................................. B30B 11/02
(52) U.S. Cl. ...................... 425/77; 264/39; 425/352
(58) Field of Search ................... 425/77, 352; 264/39

(56) References Cited

U.S. PATENT DOCUMENTS

| | | | | |
|---|---|---|---|---|
| 2,941,241 A | * | 6/1960 | Strong | 425/77 |
| 2,941,246 A | * | 6/1960 | Bundy | 425/77 |
| 2,941,248 A | * | 6/1960 | Hall | 425/77 |
| 4,140,448 A | * | 2/1979 | Brinkeborn et al. | 425/77 |
| 4,197,066 A | * | 4/1980 | Kennedy | 425/77 |
| 4,523,748 A | * | 6/1985 | Latter | 425/77 |

* cited by examiner

*Primary Examiner*—James P. Mackey
(74) *Attorney, Agent, or Firm*—Mueller and Smith, LPA

(57) ABSTRACT

A belt/die, pre-tensioned loaded windings, or other high-pressure apparatus has a series of annular rings for confining material being subjected to high-pressure treatment. The series of annular rings has an inner annular ring having an inner upper edge, an outer upper edge, an inner lower edge, and an outer lower edge. The inner lower edge is chamfered at an angle of greater than about 60° from the vertical in order to create a transition slope that mitigates tensile stresses.

17 Claims, 2 Drawing Sheets

HIGH PRESSURE APPARATUS HAVING TRANSITION SLOPE BINDING RING THAT MITIGATES TENSILE STRESSES AND CORRESPONDING METHOD

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates generally to high-pressure apparatuses and more particularly to a ring design that minimizes ring failures.

Conventional high pressure/high temperature (HP/HT) apparatuses, which may be of the belt-type or die-type, are described, for example, in U.S. Pat. Nos.; 2,941,241; 2,941, 248; 2,947,617; 3,609,818; 3,767,371; 4,289,503; 4,409, 193; 4,673,414; 4,810,479; and 4,954,139, and French Pat. No. 2,597,087, the disclosures of which are expressly incorporated herein by reference. It is not uncommon for these types of HP apparatuses to contain on the order of 800,000 to 1,000,000 psi. Materials of construction and tooling design permit such pressures (as well as high temperatures, say, on the order of 2,000° C.) to be generated for preparation of diamond, cubic boron nitride (CBN), hexagonal boron nitride (HBN), and the like.

A series of rings (belt set) or wound containers are used to confine the contents (e.g., graphite when diamond is being made and boron nitride when CBN is being made) being subjected to such high pressures, which normally are created by punches or dies. A rounded or radius corner has been applied to such rings in order to avoid galling during the assembly of the inner ring and to eliminate a sharp edge for worker safety. Unfortunately, such a radius corner creates tensile stresses, which leads to fatigue failure. Failure of the ring causes a local loss of tooling, not to mention loss of product and down time to assemble new tooling for the HP apparatus. By eliminating tensile stresses and maintaining only compressive forces, such ring failures would be less likely to occur.

Thus, there exists a need in the art to design inner HP rings that do not create tensile stresses with subsequent ring fatigue failure. It is to such need that the present invention is addressed.

BRIEF SUMMARY OF THE INVENTION

Unexpected, it has been discovered that the inner annular binding ring's inner upper edge has an area that is under tensile stresses. By removing the ring material under tensile stresses, the propensity of the inner binding ring to fracture is significantly lessened. Such binding ring material can be conveniently removed by chamfering the inner upper edge of the inner annular binding ring at an angle of greater than about 60° from the vertical. The remaining ring material is under compressive stresses and is less likely to fracture during the high-pressure operation. Such chamfering operation creates a transition slope that mitigates tensile stresses.

The invention, then, is high-pressure apparatus (belt/die, pre-tensioned loaded windings, or other configuration) which has a series of annular binding rings for confining material being subjected to high-pressure treatment. The series of annular binding rings has an inner annular binding ring having an inner upper edge, an outer upper edge, an inner lower edge, and an outer lower edge. The inner lower edge is chamfered at an angle of greater than about 60° from the vertical.

Advantages of the present invention include the ability to lessen fatigue failures of inner annular binding rings of HP apparatuses. Another advantage is the ability to achieve such fatigue failure lessening by a machining operation. A further advantage is that the chamfered inner ring still is worker safe. These and other advantages will be readily apparent to those skilled in the art.

BRIEF DESCRIPTION OF THE DRAWINGS

For a fuller understanding of the nature and advantages of the present invention, reference should be had to the following detailed description taken in connection with the accompanying drawings, in which.

The drawings will be described in greater detail below.

DETAILED DESCRIPTION OF THE INVENTION

Figure 1:
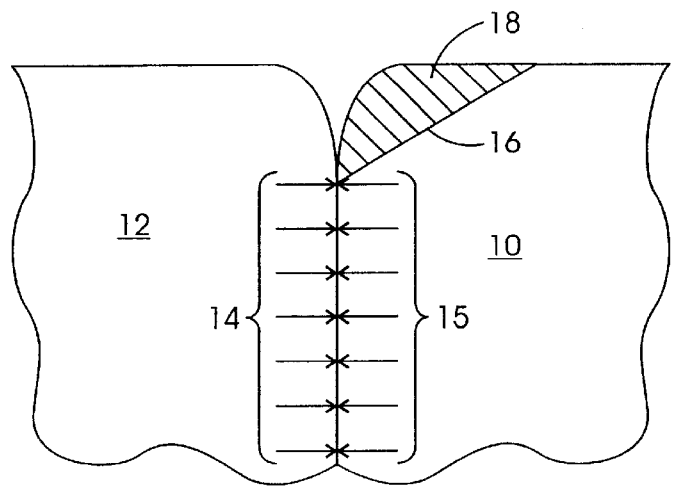
FIG. 1 is an exploded simplified sectional view of the inner upper edge of the inner or "A" binding ring adjacent to the inner annular ring.

Referring initially to FIG. 1, binding rings 10 and 12 are shown in partial-sectional view. Arrows 14 indicate forces being exerted by ring 12 on ring 10, and arrows 15 the opposite opposing forces exerted by ring 10 on ring 12. These forces are transmitted at about a 45° angle, such as illustrated by line 16 for force arrows 14. A similar force profile would be present in ring 12. Line 16 will be discussed for illustration purposes and not by way of limitation. Ring area 18 bounded by force line 16 is not under compression, but rather is subject to tensile forces. Area 18 (actually a volume of ring material), then, has been determined to be subject to fracturing during HP operations. By chamfering binding ring 10 somewhere around line 16, the area of ring material subject to failure has been eliminated and no new tensile stresses created. Thus, the likelihood that binding ring 10 will fail also has been materially reduced. Such is an achievement of the present invention. Line 16 advantageously is around 60° from the vertical. Broadly, the chamfer can range from about 45° to 80° from the vertical.

Figure 2:
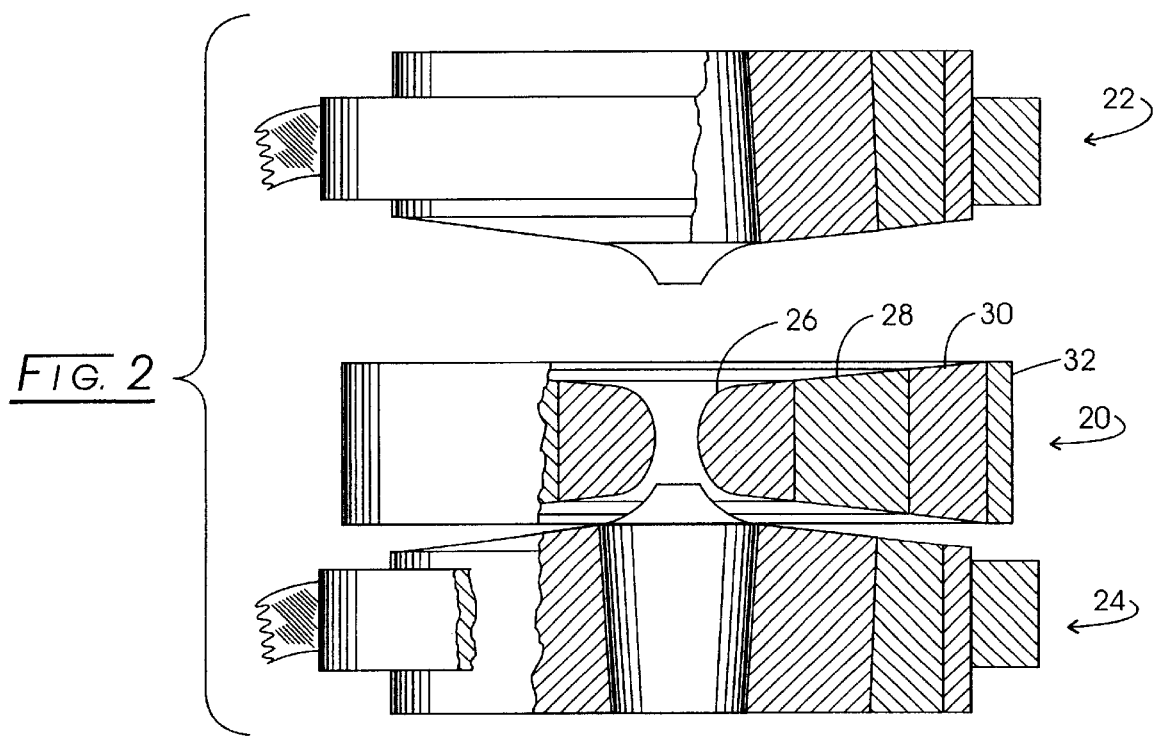
FIG. 2 is an exploded sectional view of an HP/HT apparatus that includes the annular binding rings formed from a belt set.

Referring now to FIG. 2, the ring assembly, 20, is used in a high-pressure apparatus that includes an upper punch assembly, 22, and a lower punch assembly, 24. The punch assemblies are conventional and additional information on them can be found in the patents cited above.

A die, 26, confines the cell assembly (not shown) being subjected to the FP (and often HT) operation. Annular binding rings, 28 and 30, surmount and retain inner annular ring 26. An annular safety ring, 32, surrounds die 26, and binding rings 28 and 30. It will be appreciated that the number of binding rings may be more than the number shown in FIG. 2 as the two binding rings shown are for illustration purposes only.

It is inner annular binding ring 28 that is subject to the chamfer in accordance with the present invention. In this regard, while all or less than all of the binding rings can be chamfered, work on the present invention has revealed that only inner binding ring 28 needs to be chamfered in order to significantly reduce incidences of breakage. Further, while both the upper and lower inner edges of ring 28 can be chamfered, only the lower edge needs to be chamfered in order to garner the benefits of the present invention. The geometry of the ring assembly will dictate which of the ring(s) will require a transition slope that mitigates tensile stresses.

Figure 3:
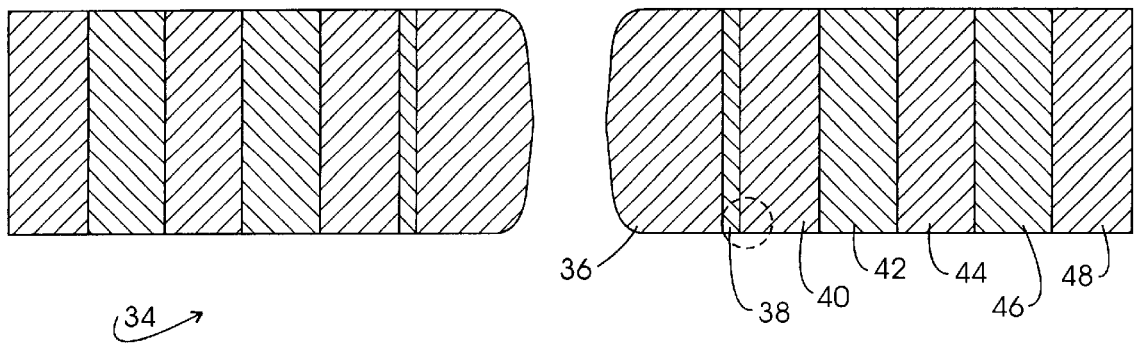
FIG. 3 is an exploded simplified sectional view of a set of annular binding rings.
Figure 4:
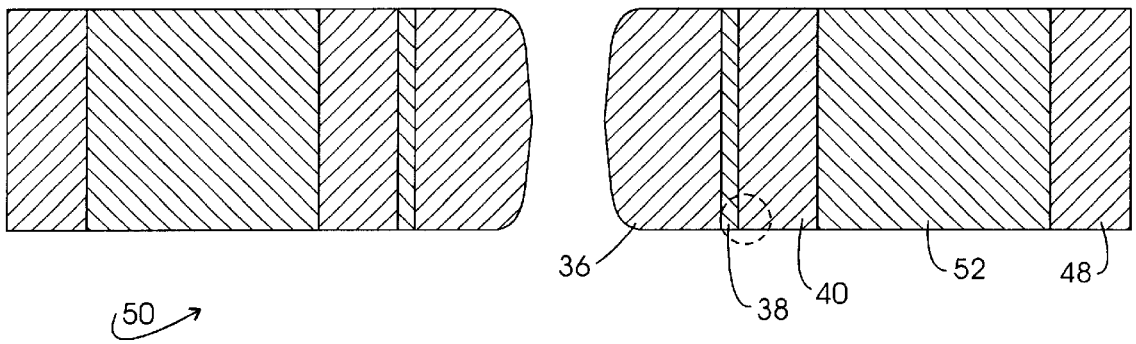
FIG. 4; is an exploded simplified sectional view of a set of annular binding rings formed from pre-tensioned windings.

FIG. 3 illustrates a multiple ring assembly, 34, in greater detail. Ring assembly 34 surrounds a die, 36. Die 36 is surrounded a wear ring, 38, which in turn is surrounded by a series of annular binding rings, 40–46. A safety ring, 48, surrounds the binding rings. Binding rings 42–46, which may be greater or lesser in number, can be replaced by pre-tensioned windings, as those skilled in this art are aware.

Figure 5:
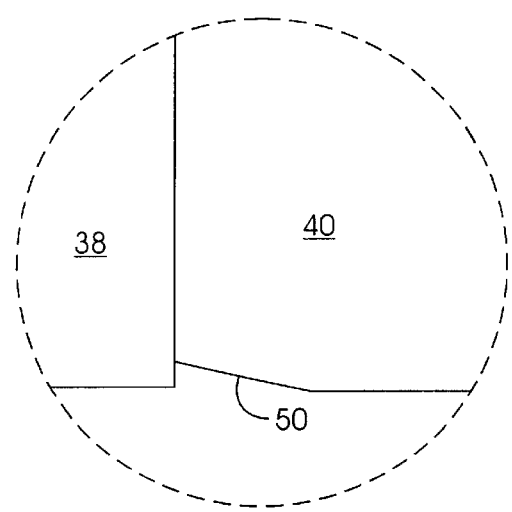
FIG. 5 is an exploded sectional view of the chamfer on the inner annular binding ring of the annular binding ring set of FIGS. 3 and 4.

In this regard, while the binding rings can be made of solid (e.g., steel) material, they also can be made from pre-tensioned windings, such as illustrated in FIG. 5 for ring assembly 50. A die, 36, is surrounded a wear ring, 38, which in turn is surrounded by a pretensioned loaded windings assembly, 52. A safety ring, 48, surrounds the binding rings.

The lower arrangement between wear ring 38 and inner binding ring 40 for both assemblies 34 and 50 is shown in an exploded view in FIG. 5. Again, chamfer 50 is shown formed in binding ring 40. It also was determined that wear ring 38 did not need to be similarly chamfered in order to realized the benefits of the present invention.

The chamfer can be formed in the inner binding ring by grinding, laser cutting, electrodischarge machining (EDM), or other suitable material removal operations. The particular technique of forming the chamfer is not important. Once the chamfer is formed, the rings are assembled and used in conventional fashion.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

What is claimed is:

1. An improved inner binding ring for a high-pressure apparatus, which comprises:
   an inner binding annular ring having an inner upper edge, an outer upper edge,
   an inner lower edge, and an outer lower edge, said inner lower edge being chamfered at an angle of greater than about 60° from the vertical to create a transition slope that mitigates tensile stresses.

2. The improved inner binding ring of claim 1, wherein said inner upper edge also is chamfered at an angle of greater than about 60° from the vertical.

3. The improved inner binding ring of claim 1, wherein said angle ranges from between about 45° and 80° from the vertical.

4. An improved belt/die high-pressure apparatus having a series of annular binding rings for confining material being subjected to high-pressure treatment, the improvement, which comprises:
   said series of annular binding rings having an inner binding annular ring having an inner upper edge, an outer upper edge, an inner lower edge, and an outer lower edge, said inner lower edge being chamfered at an angle of greater than about 60° from the vertical to create a transition slope that mitigates tensile stresses.

5. The improved belt or die high-pressure apparatus of claim 4, wherein said inner upper edge also is chamfered at an angle of greater than about 60° from the vertical.

6. The improved belt/die high-pressure apparatus of claim 4, wherein said inner binding ring is part of a binding ring assembly that contains a plurality of binding rings each having an inner lower edge, wherein more than one said binding inner lower edges is chamfered.

7. The improved belt/die high-pressure apparatus of claim 4, wherein said angle ranges from between about 45° and 80° from the vertical.

8. An improved high-pressure apparatus having pre-tensioned loaded windings assembly for confining material being subjected to high-pressure treatment, the improvement, which comprises:
   said pre-tensioned loaded windings assembly having an inner binding annular ring having an inner upper edge, an outer upper edge, an inner lower edge, and an outer lower edge, said inner lower edge being chamfered at an angle of greater than about 60° from the vertical to create a transition slope that mitigates tensile stresses.

9. The improved high-pressure apparatus of claim 8, wherein said inner upper edge also is chamfered at an angle of greater than about 60° from the vertical.

10. The improved high-pressure apparatus of claim 8, wherein a wear ring is disposed interiorally adjacent to said inner binding ring.

11. The improved high-pressure apparatus of claim 8, wherein said angle ranges from between about 45° and 80° from the vertical.

12. A method for mitigating tensile stresses in an inner binding ring for a high-pressure apparatus, wherein said inner binding annular ring has an inner upper edge, an outer upper edge, an inner lower edge, and an outer lower edge, which comprises:
   chamfering said inner lower edge at an angle of greater than about 60° from the vertical to create a transition slope that mitigates tensile stresses.

13. The method of claim 12, wherein said high-pressure apparatus is a belt/die high-pressure apparatus.

14. The method of claim 12, wherein said high-pressure apparatus is a pre-tensioned loaded windings high-pressure apparatus.

15. The method of claim 12, wherein said inner lower edge is chamfered at an angle of between about 45° and 80° from the vertical.

16. The method of claim 13, wherein said inner upper edge also is chamfered at an angle of greater than about 60° from the vertical.

17. The method of claim 13, wherein said inner binding ring is part of a binding ring assembly that contains a plurality of binding rings each having an inner lower edge, wherein more than one said binding inner lower edges is chamfered.

* * * * *